United States Patent [19]

Larson et al.

[11] 4,101,636

[45] Jul. 18, 1978

[54] DEFLUORINATED PHOSPHATE ROCK PROCESS USING LIME

[75] Inventors: Harold V. Larson; Morris E. Clark, both of Pasadena, Tex.

[73] Assignee: Olin Corporation, New Haven, Conn.

[21] Appl. No.: 761,049

[22] Filed: Jan. 21, 1977

[51] Int. Cl.$^2$ .................. C01B 15/16; C01B 25/26; C05B 13/00
[52] U.S. Cl. ........................................ 423/305; 71/44; 71/DIG. 3
[58] Field of Search ............... 423/305, 307, 306, 311; 71/DIG. 3, 44

[56] References Cited

U.S. PATENT DOCUMENTS

| 2,562,718 | 7/1951 | Hollingsworth | 71/DIG. 3 |
| 2,997,367 | 8/1961 | Williams | 71/44 |
| 3,184,433 | 6/1965 | Hollingsworth et al. | 71/44 |

*Primary Examiner*—O. R. Vertiz
*Assistant Examiner*—Gregory A. Heller
*Attorney, Agent, or Firm*—Donald F. Clements; James B. Haglind

[57] ABSTRACT

An improved process is described for preparing defluorinated phosphate rock from fluorine-containing phosphate rock which contains acid insoluble impurities in excess of about 6 percent by weight. The improvement is particularly useful in the fluidized bed technique for preparing defluorinated phosphate rock wherein fluorine-containing phosphate rock, a sodium compound such as sodium carbonate, phosphoric acid and water are admixed to form granules. The resulting granules are dried and heated in a fluidized bed calciner at a temperature within the range of from about 980° to about 1,350° C to evolve sufficient fluorine to produce defluorinated phosphate rock graules having less than 1 part of fluorine per 100 parts of phosphorus by weight. The resulting defluorinated granules are colled and stored for use as an animal feed which contains at least 18 percent by weight of phosphorus. The improvement of this invention comprises admixing a lime compound with the phosphoric acid, prior to mixing with the other ingredients, to form a lime-acid slurry having a CaO to $P_2O_5$ weight ratio in the range from about 0.01:1 to about 0.20:1.

17 Claims, 2 Drawing Figures

DEFLUORINATED PHOSPHATE ROCK PROCESS USING LIME

This invention relates to an improved process for preparing defluorinated phosphate rock from fluorine-containing phosphate rock.

Numerous processes have been developed to produce an acceptable animal feed from fluorine-containing phosphate rock in rotary kilns, molten bed furnaces, fluidized bed calciners and the like. In order to provide an acceptable animal feed, it is necessary to reduce the fluorine concentration to less than about 1 part of fluorine per 100 parts of phosphorus by weight in the defluorinated phosphate rock. In addition, industry specifications require that the phosphorus content of the defluorinated phosphate rock be at least 18 percent by weight.

U.S. Pat. No. 2,893,834, which issued July 7, 1959 to Woodrow W. Richardson, describes a process for defluorinating phosphate rock in a rotary kiln at a temperature in the range from about 2,300° F (1,260° C) to about 2,700° F (1,482° C). The fluorine-containing phosphate rock is mixed with phosphoric acid, water and an alkali metal salt in proportions to provide a final product wherein the molar ratio of certain ions to other ions in accordance with the following formula, $$\frac{\text{Moles}}{\text{Moles}} = \frac{CaO + MgO + Na_2O + K_2O - SO_3 - F_2}{P_2O_5 - Fe_2O_3 - Al_2O_3} \quad \text{(I)}$$

is in the range between 2.5 and 3.8. In addition, the defluorination is carried out in the presence of a gaseous atmosphere containing between about 5 and about 30 mole percent of water vapor. The calcined product is quenched to a temperature below about 1,900° F (1,038° C). Although this technique may be satisfactory for preparing defluorinated phosphate rock which is acceptable for use as an animal feed, there is no provision in this disclosed technique for handling fluorine-containing phosphate rock which has a high concentration of acid insoluble materials, for example, in excess of about 6 percent by weight. The proposed formula in the U.S. Pat. No. 2,893,834 completely ignores the silica content or acid insoluble content. Thus, there is no provision in the U.S. Pat. No. 2,893,834 for adjusting the reactants to maintain a phosphorus content in excess of about 18 percent by weight in the product when the acid insoluble content of the feed rock exceeds about 6 percent by weight.

Another technique for preparing defluorinated phosphate rock is described in U.S. Pat. No. 2,997,367, which issued Aug. 22, 1961 to William B. Williams. This process admixes fluorine-containing phosphate rock with phosphoric acid and either a calcium-containing compound, such as limestone, or an alkali metal salt, such as sodium carbonate, and melts the resulting mixture at a temperature of at least about 2,700° F (1,482° C). The molten product is quenched to a temperature below about 900° F (482° C) and stored for use as an animal feed. The process of the U.S. Pat. No. 2,997,367 may also be satisfactory for preparing defluorinated phosphate rock which is acceptable for use as an animal feed from phosphate rock containing less than about 6 percent by weight of acid insoluble materials. The U.S. Pat. No. 2,997,367, however, is completely silent with respect to providing techniques for handling the high concentration of silica or acid insoluble materials in the rock and its effect upon the phosphorus content of the final product.

More recently, a fluidized bed calciner technique has been developed for preparing defluorinated phosphate rock, as described in U.S. Pat. No. 3,364,008, which issued Jan. 16, 1968 to Clinton A. Hollingsworth et al. This process also provides for mixing fluorine-containing phosphate rock with phosphoric acid, water and preferably a sodium compound to form non-agglomerated granules. These granules are fed to a fluidized bed, and heated to a temperature generally in the range from about 2,220° F (1,204° C) to about 2,700° F (1,482° C) to effect defluorination. The resulting calcined product is cooled and stored for use as an animal feed. This process controls the proportion of rock, phosphoric acid and sodium compound in accordance with the formula as expressed in U.S. Pat. No. 2,995,436, issuing Aug. 8, 1961 to Clinton A. Hollingsworth et al, which is as follows:

$$\frac{\text{Mols CaO} + Na_2O - 3P_2O_5}{\text{Mols SiO}_2} \quad \text{(II)}$$

wherein the molar ratio of the constituents of the calcining charge is in the range between 1.6:1 and 2:1. The formula of the U.S. Pat. No. 2,995,436 provides for the silica or acid insoluble content of the phosphate rock, but the process is expressly limited to using phosphate material containing from 2 to 6 percent by weight of silica, which generally corresponds to the acid insoluble content. There is no provision in the U.S. Pat. No. 2,995,436 for defluorinating phosphate rock containing in excess of 6 percent by weight of acid insoluble material, and also for producing a defluorinated phosphate rock material which contains at least 18 percent by weight of phosphorus.

As long as relatively pure phosphate rock concentrates are available, the above described processes are satisfactory for preparing defluorinated phosphate rock which is acceptable for use as an animal feed. However, it is well recognized in the industry that phosphate rock deposits capable of producing relatively high BPL (Bone Phosphate of Lime) phosphate rock concentrates are rapidly diminishing. Costs have increased for phosphate rock concentrates which contain, for example, greater than about 72 percent BPL by weight and less than about 4 percent by weight of acid insolubles. In an effort to maintain acceptable profit levels, feed producers have resorted to using lower cost, less pure phosphate rock concentrates which contain, for example, from about 68 to 70 percent BPL by weight and from about 6 to about 10 percent acid insolubles by weight. Although such lower grade phosphate rock materials can be successfully defluorinated by conventional defluorination techniques, the excess acid insoluble content of the starting phosphate rock adversely dilutes the final product and makes it difficult to produce a defluorinated phosphate rock having a phosphorus content in excess of about 18 percent by weight.

There is a need at the present time in the animal feed industry for an improved process for preparing defluorinated phosphate rock containing less than about 1 part of fluorine per 100 parts of phosphorus by weight and also containing at least 18 percent by weight of phosphorus, from a fluorine-containing phosphate rock containing acid insoluble materials in excess of about 6 percent up to about 10 percent by weight.

It is a primary object of this invention to provide an improved process for preparing defluorinated phosphate rock from fluorine-containing phosphate rock containing in excess of about 6 percent up to about 10 percent by weight of acid insoluble material.

It is a further object of this invention to provide an improved method of preparing defluorinated phosphate rock by the fluidized bed calciner technique.

Still another object of the invention is to provide a method of controlling granule size of the calciner feed in a fluidized bed calciner technique for preparing defluorinated phosphate rock.

It is still another object of this invention to provide an improved method of preparing defluorinated phosphate rock containing at least 18 percent by weight of phosphorus from phosphate rock concentrate containing in excess of about 6 percent up to about 10 percent by weight of acid insolubles.

These and other objects of the invention will be apparent from the following detailed description thereof.

BRIEF DESCRIPTION OF THE INVENTION

It has now been discovered that the foregoing objects are accomplished in a process for preparing defluorinated phosphate rock which comprises:

(a) forming a mixture of a fluorine-containing phosphate rock, soda ash, water and phosphoric acid;

(b) granulating the resulting mixture, and (c) heating the resulting granules to a temperature within the range from about 980° to about 1,350° C. whereby sufficient fluorine is evolved to produce defluorinated phosphate rock granules having less than one part of fluorine per 100 parts of phosphorus by weight, characterized by the improvement which comprises:

(d) employing fluorine-containing phosphate rock which has an acid insoluble content in excess of about 6 percent up to about 10 percent by weight, and (e) admixing sufficient lime with said phosphoric acid to form an acid slurry prior to forming said mixture in step (a), and adding sufficient amounts of said acid slurry to said mixture to provide a CaO to $P_2O_5$ weight ratio in said mixture in the range from about 1.010:1 to about 1.058:1.

The resulting defluorinated phosphate rock granules are cooled and stored for use as an animal feed or component thereof. Not only does this improved technique permit the use of relatively low grade phosphate rock concentrate in the production of defluorinated phosphate rock which is acceptable for use as an animal feed under present commercial specifications, but also it provides a means for controlling the granule size of the calciner feed.

DETAILED DESCRIPTION OF THE INVENTION

Figure 1:
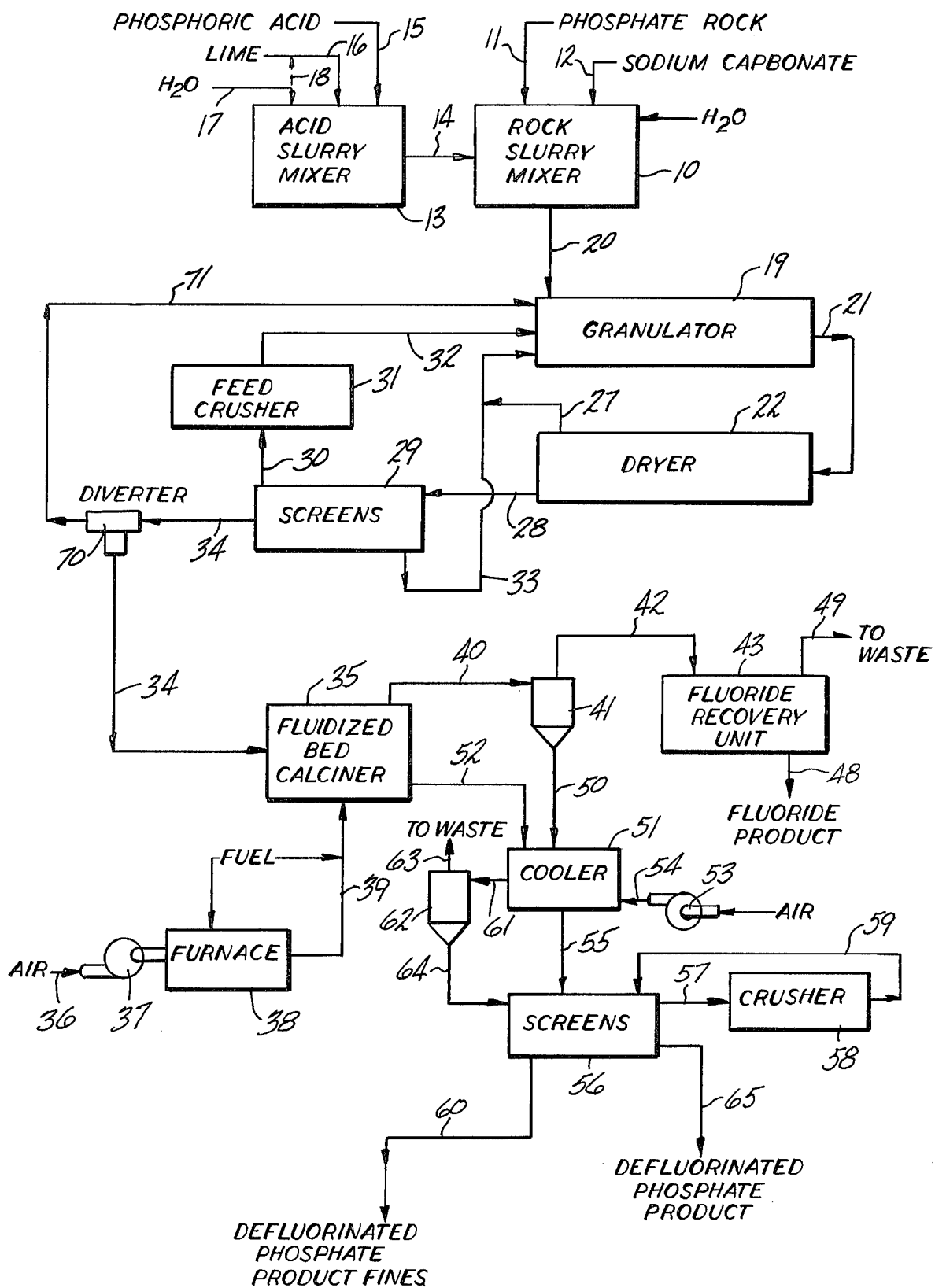
FIG. 1 is a schematic drawing of a typical fluidized bed calciner technique for preparing defluorinated phosphate rock showing the improvements of this invention.

More in detail, the process of this invention is shown in schematic form in FIG. 1. Rock slurry mixer 10, which is a suitable tank or other vessel provided with agitation means is used to prepare the slurry of fluorine-containing phosphate rock and other reactants. Phosphate rock, which is generally a fluorine-containing concentrate containing from about 65 to about 78 percent BPL by weight and acid insolubles in excess of about 6 percent and up to about 10 percent by weight, and having a particle size all of which passes about a 35 mesh Tyler standard screen, is fed from a suitable hopper (not shown) through rock feed line 11 to rock slurry mixer 10. It is preferred to employ Florida phosphate rock, which generally contains less than about 1.5% by weight of $Al_2O_3$ and less than about 1.5% by weight of $Fe_2O_3$. However, phosphate rock from other sources, which is generally less pure than Florida phosphate rock concentrate, may be defluorinated satisfactorily in accordance with the process of this invention.

Preferably a maximum of about 18 percent of the fluorine-containing phosphate rock feed is retained on a 100 mesh screen and a minimum of about 50 percent by weight passes through a 200 mesh Tyler standard screen. All screen sizes presented throughout the description and claims in terms of "mesh" to Tyler standard screens.

Sodium carbonate from a suitable hopper (not shown) is fed to rock slurry mixer 10 through sodium carbonate feed line 12. The sodium carbonate employed in preparing the phosphate rock slurry is generally commercially available soda ash which contains greater than 99 percent by weight $Na_2CO_3$ (58% $Na_2O$) and substantially all of the particles pass through a 35 mesh screen. Although sodium carbonate is the preferred source of sodium, it will be recognized by those skilled in the art that other sodium compounds, such as sodium phosphate, sodium nitrate, sodium formate, sodium chloride and the like may be used to replace part or all of the sodium carbonate component. It will be recognized by those skilled in the art that the term "sodium carbonate" as used throughout the description and claims is intended to include any compound capable of providing $Na_2O$ under the reaction conditions obtained without adversely affecting the process.

Acid slurry mixer 13, which is a suitable tank or other vessel provided with agitation means, is used to prepare an acid slurry for feeding to rock slurry mixer 10 through acid slurry feed line 14. The acid slurry is prepared by mixing phosphoric acid, lime and water in acid slurry mixer 13. The phosphoric acid suitable for use as a reactant in the present invention is any conventional wet process phosphoric acid such as one having a $P_2O_5$ concentration in the range from about 24 to about 32 percent by weight and containing less than about 25 percent by weight of non-volatile impurities based upon the $P_2O_5$ content. The phosphoric acid may be previously defluorinated, but need not be, since removal of the fluoride component can be substantially completely effected by subsequent calcining in the process of this invention. Phosphoric acid stored in a suitable vessel (not shown) is fed through phosphoric feed line 15 to acid slurry mixer 13.

Lime or a suitable lime-forming substance is conveyed from a suitable hopper or tank (not shown) through lime feed line 16 to acid slurry mixer 13. It is preferred to employ commercially available calcium hydroxide, which contains 95 percent or more by weight of Ca(OH)$_2$, and which preferably has a particle size all of which passes through about a 20 mesh screen. The proportion of lime in terms of weight of CaO to weight of P$_2$O$_5$ in the acid is discussed more fully below in the explanation of FIG. 2. Another form of lime which is satisfactory for use in the process of this invention is the aqueous lime slurry available commercially which normally has a specific gravity of about 1.280, contains about 4.28 pounds of dry lime solids per gallon, and weighs about 10.662 pounds per gallon. Other sources of CaO may also be used, but are generally not as satisfactory as lime. For example, gypsum may be employed, but serious pelletizing problems may occur when this type of CaO material is employed. Calcium carbonate may also be used as a source of CaO, but excessive foaming in the phosphoric acid slurry mixing and rock slurry mixing must be dealt with. Thus, one skilled in the art will recognize that when the term "lime" is employed throughout the description and claims it is intended to include any compound capable of providing CaO under the reaction conditions obtained without adversely affecting the process.

Sufficient water is added to acid slurry mixer 13 through water feed line 17 to provide a slurry of phosphoric acid, lime and water having a specific gravity in the range from about 1.20 to about 1.50 and preferably from about 1.35 to about 1.38. If desired, all of the water can be added with the phosphoric acid, but need not be. Water employed to make up the acid slurry may contain minor impurities, such as fluorine, iron and aluminum, as well as calcium and phosphate values. Therefore, waste streams from other phosphate processes may be employed in the lime-phosphoric acid slurry make-up. If desired, a portion or all of the water may be used to pre-form an aqueous lime slurry by conveying water from water feed line 17 through lime slurry water line 18 (shown in dotted form in FIG. 1) to lime feed line 16. If desired, the water may be added to the lime hopper (not shown) and the resulting aqueous lime slurry is conveyed through lime feed line 16 to acid slurry mixer. The water content of the aqueous lime slurry is not critical since water may be added in subsequent granulation steps, as described below. Generally, the aqueous lime slurry has a specific gravity in the range from about 1.1 to about 1.4 and preferably from about 1.2 to about 1.35.

The lime-phosphoric acid slurry, sodium carbonate and phosphate rock are admixed in rock slurry mixer 10 in the proportions described more fully below, and the resulting slurry is conveyed to granulator 19 through rock slurry feed line 20. Granulator 19 may be any suitable granulating device, such as a rotary granulator, blunger, pug mill or the like, which is capable of mixing and agglomerating in granular form the components of the slurry with recycled solids from sources described more fully below. A bed of dry recycle solids is established in granulator 19 and slurry from rock slurry mixer 10 is conveyed through rock slurry feed line 20 to a suitable nozzle or nozzles (not shown) in granulator 19 where the rock slurry is sprayed onto the moving bed of dry recycled solids. In this technique the dry solids are coated with relatively thin successive coatings of the rock slurry, thereby forming wet agglomerated granules containing a substantial portion of fluorine-containing phosphate rock. The size of the dry recycled solids gradually increased by wetting and agglomeration as they pass through granulator 19 and are conveyed through granulator discharge line 21 to dryer 22. Dryer 22 is any suitable dryer, such as a rotating dryer, fluidized bed dryer or shelf dryer, capable of reducing the water content to the desired range. Generally, the water content of the wet granules fed through granulator discharge line 21 ranges from about 2 percent to about 7 percent, and the water content of the dried granules ranges from about 0 percent to about 1 percent by weight. If desired, the granulation and drying steps may be combined in a single granulator-dryer unit (not shown).

Dryer 22 is provided with a suitable dust collection means (not shown) which is capable of collecting finely divided phosphate rock particles, sodium carbonate, and the like, and conveying them through fines recycle line 27 to granulator 19. The dry granules are conveyed from dryer 22 through dryer discharge line 28 to screens 29 or other suitable solid classification system. Screens 29 generally separate dryer discharge into three fractions, i.e., coarse fraction, fine fraction and product feed fraction. Coarse Fraction (dry granules which do not pass, for example, an 8 mesh screen) are conveyed from screens 29 through coarse fraction discharge line 30 to a feed crusher 31 or other suitable comminution apparatus. Feed crusher 31 generally comminutes the coarse fraction until all of the particles pass a 20 mesh screen. The resulting comminuted particles are recycled through crushed feed line 32 to granulator 19 to help establish a bed of dry recycled solids in granulator 19.

The fine fraction separated in screens 29 is conveyed through fine fraction recycle line 33 to help establish a moving bed of dry recycled solids in granulator 19. The product feed fraction from screens 29, generally has a particle size in the range from about $-8+18$ mesh, but coarser or finer ranges may be employed. For example, the product feed fraction size may range from $-4+40$, but is preferably $-10+14$ mesh. The product feed fraction is conveyed through product feed line 34 to fluidized bed calciner 35. If desired, a portion of the product feed fraction also may be conveyed by means of diverter 70 through product feed fraction recycle line 71 to granulator 19 to help establish a moving bed of recycle solids therein.

In the operation of fluidized bed calciner 35, air is conveyed from air feed line 36 or other air source through a suitable blower 37 to furnace 38 where it is mixed with combustion gases to form a gaseous mixture containing air and water vapor having a temperature in the range of from about 530° to about 880° C, and preferably from about 620° to about 700° C. This gaseous mixture is conveyed through combustion gas feed line 39 to the bottom of fluidized bed calciner 35 where it is admixed with a suitable fuel such as natural gas. Combustion of this mixture in fluidized bed calciner 35 produces a heated combustion gas containing water vapor in the range from about 15 to about 20 percent by weight, which fluidizes the product feed fraction fed to calciner 35.

Defluorination of the dry granules of product feed fraction in fluidized bed calciner 35 is generally obtained by heating the granules to a temperature in the range from about 980° to about 1,350° and preferably from about 1,260° to about 1,290° C. Hold-up time for the solids under these conditions in the fluidized bed calciner 35 generally ranges from about 3 to about 10 and preferably from about 4 to about 5 hours. Exhaust gases are removed continuously from fluidized bed calciner 35 through exhaust gas line 40 which conveys the gases to cyclone 41 or other suitable solid-gas separation unit. The exhaust gases from fluidized bed calciner 35 not only contain finely divided particles of phosphate rock, soda ash and the like, but also contain the fluoride impurities in gaseous form. Cyclone 41 separates these components of the exhaust gas and conveys the fluorine-containing gases through fluorine gas line 42 to fluoride recovery unit 43. In fluoride recovery unit 43, the fluorine gases are scrubbed with water in the presence of a dilute hydrogen fluoride solution to form a more concentrated aqueous hydrogen fluoride solution, which is removed through fluoride product line 48. Exhaust gases from fluoride recovery unit 43 are conveyed through exhaust gas line 49 to waste.

Finely divided particles of defluorinated phosphate rock removed in cyclone 41 are conveyed through cyclone discharge line 50 to cooler 51. In addition, solids from fluidized bed calciner 35 are conveyed through solids discharge line 52 to cooler 51. Air from a suitable source is conveyed through cooler blower 53 through cooler air line 54 to cooler 51 where the hot solids from fluidized bed calciner 35 are cooled to a temperature of less than about 150° C, and preferably below about 75° C. Cool solids from cooler 51 are conveyed through cooler product line 55 to product screens 56 or other suitable solids classification equipment. Product screens 56 separate the cooled product into three fractions, i.e., a coarse fraction, a fine fraction and a defluorinated phosphate product fraction. The coarse fraction, which is generally retained on about a 16 mesh screen is conveyed through coarse product discharge line 57 to product crusher 58 or other suitable comminution device, where the coarse product is comminuted to pass a 16 mesh screen. The comminuted product of product crusher 58 is recycled through comminuted product line 59 to product screens 56.

The fine fraction of defluorinated phosphate is conveyed from product screens 56 through defluorinated product fines line 60 to storage for use as a component of animal feeds. In addition, fine particles of defluorinated product are separated from cooler 51 through cooler fine fraction line 61, and are conveyed to product fines cyclone 62. Exhaust gases from product fines cyclone 62 are discharged through cyclone exhaust line 63 to waste. Product fines are discharged from product fines cyclone 62 through product fines discharge line 64 and conveyed to product screens 56.

The defluorinated phosphate product fraction from screens 56 may be any desired size suitable for animal feed components. Generally, the product fraction is in the range −16+200 mesh, but a product fraction within the range −16+20 mesh is preferably obtained. If desired, fines (−200) mesh up to about 5 percent by weight may be included in the product fraction.

The defluorinated phosphate product fraction from screens 56 and the defluorinated product fines fraction from screens 56 each contain less than about 1 part fluorine per 100 parts of phosphorus by weight and each have a phosphorus content in excess of 18 percent by weight. In carrying out the process of this invention, a relatively large percentage of the original phosphate rock feed is obtained in the defluorinated phosphate product fraction from screens 56. This is achieved because of the close control of the granular size of particles obtained from granulator 19 as a result of the addition of lime to the phosphoric acid used in preparing the rock slurry in rock slurry mixer 10.

As indicated above, the prior art discloses numerous formulations and operating conditions for effecting defluorination of phosphate rock containing 6 percent or less by weight of acid insolubles without fusion. For example, the above-mentioned U.S. Pat. Nos. 2,893,834 and 3,364,008 as well as U.S. Pat. Nos. 2,995,436, 2,995,437 and 3,189,433 each present suitable formulations for preparing granular feed for defluorination furnaces.

In preparing the feed granules for the defluorination step by conventional techniques described in these references, phosphate rock, sodium carbonate, phosphoric acid and water are admixed to form a phosphate rock slurry which is then used to prepare granules for the defluorination step. In this technique, a rock slurry is prepared in which the weight ratio of CaO to $P_2O_5$ is about 1.060:1 or higher, in order to avoid fusion during the calcination step. The weight ratio of added $Na_2O$ in the sodium carbonate to the added $P_2O_5$ in the phosphoric acid is generally in the range from about 0.40:1 to about 0.60:1. Sufficient sodium carbonate is added to the rock slurry to produce a slurry having a pH of about 3.8 to enhance the pumpability of the resulting slurry. Sufficient water is added to the rock slurry to provide a water content in the range from about 27 to about 30 percent by weight, which produces a slurry having a specific gravity in the range from about 1.85 to about 1.95. When the specific gravity is less than about 1.85, the slurry is too thin to produce granules at a satisfactory rate. When the specific gravity exceeds about 1.95, the slurry is extremely difficult to pump.

In this conventional technique for defluorinating phosphate rock, employing relatively pure phosphate rock concentrate feed (above about 72% BPL and less than about 6% acid insolubles) generally components are utilized to form a rock slurry in the following proportions:

| Component | Parts By Weight |
|---|---|
| High Grade Phosphate Rock Concentrate | 1,000 |
| Sodium Carbonate | 110–150 |
| Phosphoric Acid (24 to 32% by weight) | 140–200 (as $P_2O_5$) |
| Defoaming Agent | 0–8 |
| Water | 150–250 |

In order to obtain the improved results of this invention, utilizing phosphate rock containing in excess of 6 percent by weight up to about 10 percent by weight of acid insolubles, lime and additional phosphoric acid are added to the conventional formulations described above.

When employing phosphate rock concentrates containing less than about 70 percent BPL and more than about 6 percent acid insolubles in accordance with the process of this invention, there is a need to add additional $P_2O_5$ as phosphoric acid to provide a final defluorinated phosphate rock product containing at least 18 percent by weight of phosphorus. However, when additional phosphoric acid is added to rock slurry mixer 10, an excessive amount of over-size granules are formed in granulator 19. Furthermore, as the proportion of excess phosphoric acid is increased, there is an increase in unaccountable losses of $P_2O_5$ in the calcination step effected in fluidized bed calciner 35. It has now been discovered that when finely divided lime is added to the rock slurry, particularly when lime is added to the phosphoric acid prior to adding it to rock slurry mixer 10, the tendency to form oversize granules in granulator 19 is greatly reduced, the proportion of granules in the desired range of about $-10+14$ mesh is increased, and unaccountable losses of $P_2O_5$ in the calciner are reduced.

Figure 2:
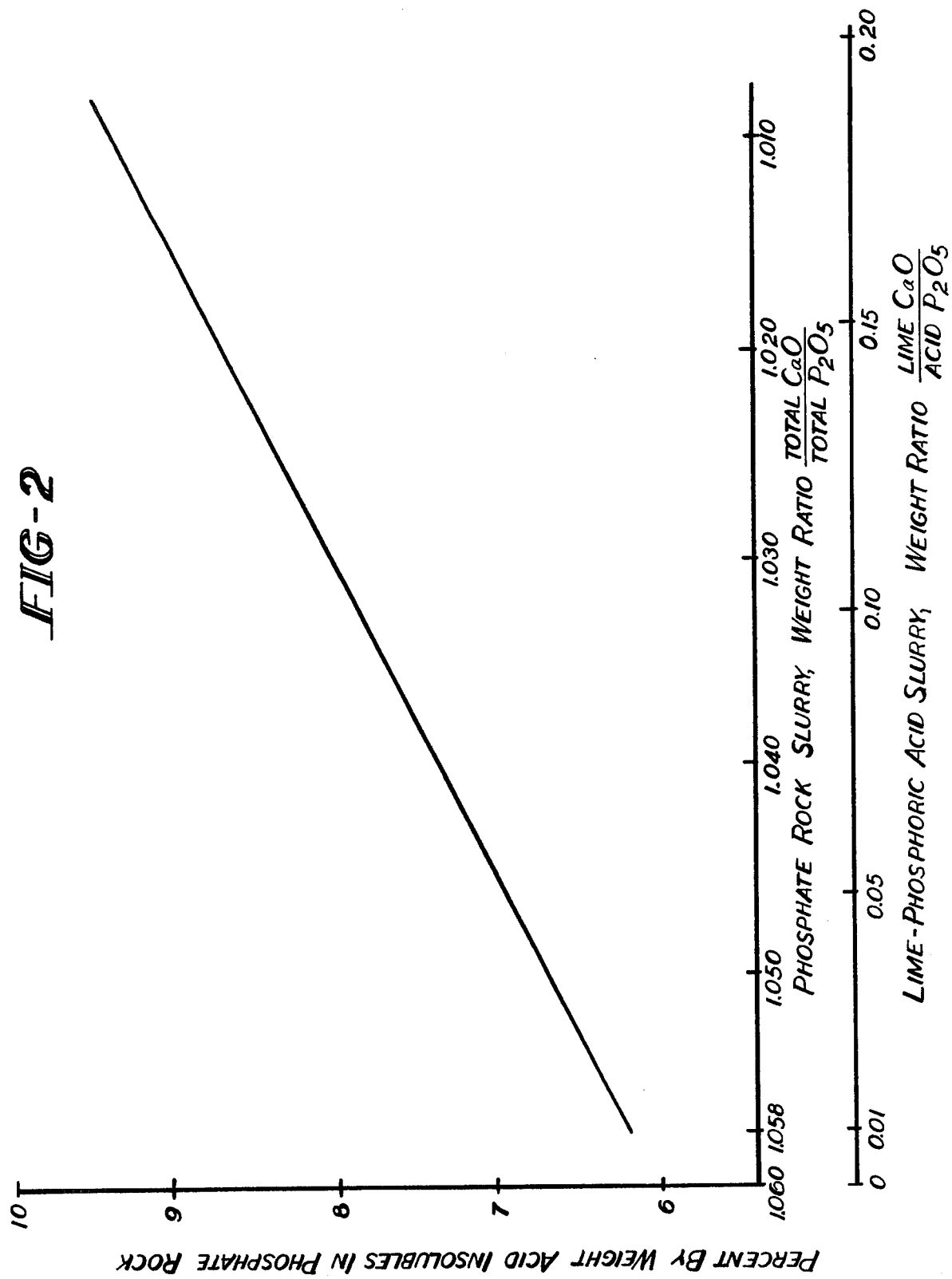
FIG. 2 is a curve which illustrates the relationship between the content of acid insolubles in the fluorine-containing phosphate rock to (a) the weight ratio of CaO to $P_2O_5$ required in the lime-phosphoric acid slurry, and (b) the weight ratio of CaO to $P_2O_5$ required in the rock slurry used to make the granules employed as the calciner feed.

FIG. 2 illustrates the approximate relationship between the added lime proportion in terms of CaO, and the added phosphoric acid proportion, in terms of $P_2O_5$, to the increase in acid insolubles in the phosphate rock concentrate feed. FIG. 2 shows that when the percentage of acid insolubles in the phosphate rock concentrate feed ranges from above about 6 to about 10 percent by weight, the proportion of additional lime and additional phosphoric acid needed above conventional acid formulation requirements, ranges from about 0.01 to about 0.20 pounds of CaO in the lime per pound of $P_2O_5$ in the phosphoric acid. Preferably, the $CaO/P_2O_5$ weight ratio in the lime-phosphoric acid slurry ranges from about 0.05:1 to about 0.15:1, and more preferably, from about 0.06:1 to about 0.10:1. FIG. 2 also shows that for the same range in acid insoluble content of the phosphate rock concentrate feed, the weight ratio of CaO to $P_2O_5$ in the phosphate rock slurry ranges from about 1.010:1 to about 1.058:1, and preferably from about 1.015:1 to about 1.040:1. Generally, the proportion of $P_2O_5$ added as phosphoric acid to the phosphate rock slurry ranges from about 20 to about 40, and preferably from about 26 to about 31 percent by weight of the total $P_2O_5$ in the phosphate rock slurry. It will be recognized that the relationship diagramed in FIG. 2 relates to a specific defluorinated phosphate rock system. Varying the capacity of granulator 19, dryer 22 and fluidized bed calciner 35 may require a change in the $CaO/P_2O_5$ ratio in the lime-phosphoric acid slurry and in the $CaO/P_2O_5$ ratio in the phosphate rock slurry.

When the weight ratio of CaO to $P_2O_5$ in the phosphate rock slurry is reduced below about 1.00, fusion of the granules in fluidized bed calciner 35 occurs, thereby causing undesirable agglomeration of the granules. Lowering the temperature to below about 980° minimizes fusion of the particles but substantially decreases the defluorinating effect of the calcinating operation. Therefore, phosphate rock concentrate feeds containing acid insolubles in excess of about 10% by weight cannot be readily defluorinated by the process of this invention. In such a situation, the higher acid insoluble phosphate rock concentrate can be blended with one having a substantially lower acid insoluble content to produce a phosphate rock concentrate feed containing 10% acid insoluble or less by weight.

The following examples are presented to define the invention more fully without limiting the scope of the invention. All parts and percentages are by weight unless otherwise specified.

EXAMPLE I

The process of this invention was employed to defluorinate a fluorine-containing phosphate rock having the following approximate analyses:

TABLE II

| Component | Percentage by Weight |
| --- | --- |
| $P_2O_5$ | 33.0 |
| CaO | 48.0 |
| $Al_2O_3$ | 0.8 |
| $Fe_2O_3$ | 1.1 |

TABLE II-continued

| Component | Percentage by Weight |
| --- | --- |
| A. I.* | 7.0–8.5 |
| $R_2O_3$** | 1.32 |
| Non-Volatiles*** | 91.22–92.72 |
| $H_2O$ | 1.0 |

*Acid insolubles by the Boric-Perchloric technique.
**Miscellaneous metal oxides, other than iron and aluminum oxides.
***Non-Volatiles = sum of the above items.

Employing a defluorination system of the type shown in FIG. 1, a lime-phosphoric acid slurry was prepared in acid slurry mixer 13 from an aqueous lime slurry and phosphoric acid. The aqueous lime slurry of $Ca(OH)_2$ had a specific gravity of 1.280. The phosphoric acid had an approximate analyses as set forth below in Table III.

TABLE III

| Component | Percentage by Weight |
| --- | --- |
| $P_2O_5$ | 29.3 |
| CaO | 1.0 |
| $Al_2O_3$ | 0.8 |
| $Fe_2O_3$ | 1.1 |
| $SiO_2$ | 1.2 |
| $Na_2O$ | 0.2 |
| Non-Volatiles* | 33.6 |
| $H_2O$ | 49.5 |
| $H_2SO_4$ | 2.0 |

*Non-Volatiles = sum of the above items.

Sufficient aqueous lime was admixed with the phosphoric acid to provide a CaO to $P_2O_5$ weight ratio of 0.08:1 in the resulting lime-phosphoric acid slurry. This acid slurry was added to rock slurry mixer 10 at the rate of about 265 parts per hour, along with about 540 parts per hour of the above-identified fluorine-containing phosphate rock, about 60 parts per hour of sodium carbonate, and about 135 parts per hour of water. The resulting phosphate rock slurry, containing about 27.5 percent water by weight and having a $CaO/P_2O_5$ weight ratio of about 1.035:1 was fed to granulator 19, which was a blunger having two rotating shafts with perpendicular spikes. The blunger admixed a bed of previously prepared dry granules of phosphate rock particles (recycle solids) with the slurry from rock slurry mixer 10, which was fed to granulator 19 at the rate of about 1,000 parts per hour.

The slurry from rock slurry mixer 10 had a pH of about 4.1, a specific gravity of about 1.90.

The temperature of the mixture in the granulator 19 was approximately 85° C and the ratio of recycled solids to solids in the slurry was about 16:1.

The resulting wet granules from granulator 19 were charged to a rotary dryer heated by co-current flowing air at an inlet temperature averaging about 450° C and an outlet temperature averaging about 90° C. Dry granules were screened to separate a calciner feed fraction having a size of $-8+18$ mesh. Under-size particles and crushed over-size particles were recycled to granulator 19. Water content of the dry particles was about 0.5 percent.

A fluidized bed calciner 35 was employed utilizing air at a pressure of 5 to 6 psig and a temperature of about 650° C for combustion with natural gas. The combustion gases used for fluidizing the bed had a temperature of from about 1,260° to about 1,290° C and flowed through the bed at the rate of about 5 to about 7 feet per second. The average retention time of the dry granules in the fluidized bed calciner 35 was from about 4 to about 5 hours.

Effluent gas from the fluidized bed calciner 35 was conveyed to cyclone 41 and the resulting gas was conveyed to the fluoride recovery unit. The separated dust particles were conveyed to a cooler along with the defluorinated solid particles removed from the central portion of fluidized bed calciner 35. In cooler 51, the defluorinated phosphate rock particles were quickly cooled to a temperature below about 150° C. The resulting defluorinated phosphate rock particles were relatively porous, having a density ranging from about 50 to about 70 pounds per cubic foot. From 70 to 90 percent of the particles passed through a 6 mesh screen. By rescreening crushed oversize, substantially all of the remainder was removed as −16+20 mesh defluorinated phosphate rock granules. The remainder of the particles were recovered as finely divided defluorinated phosphate rock which was also useful as an animal feed. The phosphorus content of the defluorinated phosphate rock product was 18.01 percent and the fluorine content ranged from 0.06 to 0.16 percent over a two month period. The available $P_2O_5$ content, as determined by solubility in hydrochloric acid, was 98.79%, as determined by solubility in citric acid was 98.65% and as determined by solubility in neutral ammonium citrate was 90.31%.

COMPARATIVE EXAMPLE A

For purposes of comparison, a procedure similar to Example I was employed except that no lime was added to the phosphoric acid and the portions of reactants used to form the rock slurry were as follows:

TABLE IV

| Component | Parts Per Hour |
|---|---|
| Phosphate Rock of Table II | 570 |
| Sodium Carbonate | 50 |
| Water | 155 |
| Phosphoric Acid having analysis of Table III | 220 |

The resulting slurry had a $CaO/P_2O_5$ weight ratio of 1.07:1 and contained 27.5 percent water. The resulting slurry was granulated, dried and calcined as in Example I. The calcined product after cooling, analyzed 17.7 percent phosphorus (40.6 percent $P_2O_5$). This product analysis was below specifications of 18 percent phosphorus and, therefore, was unsuitable for direct sale.

COMPARATIVE EXAMPLE B

The procedure of Comparative Example A was repeated except additional phosphoric acid was added to the rock slurry mixer 10 in an effort to increase the final product analysis above 18 percent phosphorus. Although the product analysis was above 18 percent phosphorus, there was formed in the granulator 19 an excessive amount of unacceptably large pellets, which overloaded screens 29 and feed crusher 31. This comparative example showed that merely adding a phosphorus compound such as phosphoric acid to the rock slurry mixer was not satisfactory to produce a defluorinated phosphate rock product having a minimum of 18 percent phosphorus in a commercially acceptable process.

What is claimed is:

1. A process for preparing defluorinated phosphate rock from a fluorine-containing phosphate rock having an acid insoluble content in the range from in excess of 6 to about 10 percent by weight, which comprises:

(a) admixing lime with phosphoric acid in a proportion to provide a CaO to $P_2O_5$ weight ratio in the range from about 0.01:1 to about 0.2:1 in the resulting acid slurry, (b) admixing said acid slurry with said phosphate rock, soda ash and water to form a mixture containing a CaO to $P_2O_5$ weight ratio in the range from about 1.010:1 to about 1.058:1, (c) granulating the resulting mixture to form granules, (d) heating said granules to dryness, (e) heating the resulting dried granules without fusion to a temperature sufficient to defluorinate said phosphate rock, whereby sufficient fluorine is evolved to produce defluorinated phosphate rock granules.

2. The process of claim 1 wherein said temperature is in the range from 980° to about 1350° C.

3. The process of claim 2 wherein said defluorinated phosphate rock granules have a phosphorous content of at least 18 percent by weight.

4. The process of claim 3 wherein said defluorinated phosphate rock granules contain less than about 1 part of fluorine per 100 parts of phosphorus by weight.

5. The process of claim 4 wherein said granules are defluorinated in a fluidized bed.

6. The process of claim 5 wherein said acid slurry has a specific gravity in the range from about 1.20 to about 1.50.

7. The process of claim 6 wherein said acid slurry is formed by adding said lime as dry lime to said phosphoric acid.

8. The process of claim 6 wherein said acid slurry is formed by adding said lime as an aqueous lime slurry having a specific gravity in the range from about 1.1 to about 1.4 to said phosphoric acid.

9. The process of claim 8 wherein said aqueous lime slurry has a specific gravity of from about 1.2 to about 1.35.

10. The process of claim 9 wherein said acid slurry has a specific gravity of from about 1.35 to about 1.38.

11. The process of claim 6 wherein said CaO to $P_2O_5$ weight ratio in said mixture is in the range from about 1.010:1 to about 1.050:1.

12. The process of claim 11 wherein said CaO to $P_2O_5$ weight ratio in said mixture is in the range from about 1.015:1 to about 1.040:1.

13. The process of claim 6 wherein sufficient lime is added to said phosphoric acid to provide a weight ratio of CaO to $P_2O_5$ in said acid slurry in the range from about 0.05:1 to about 1.15:1.

14. The process of claim 13 wherein sufficient lime is added to said phosphoric acid to provide a weight ratio of CaO to $P_2O_5$ in said acid slurry in the range from about 0.06:1 to about 0.10:1.

15. The process of claim 13 wherein said fluorine-containing phosphate rock contains from about 7 to about 9 percent by weight of acid insolubles.

16. The process of claim 13 wherein the proportion of $P_2O_5$ added as phosphoric acid to said mixture ranges from about 20 to about 40 percent by weight of the total $P_2O_5$ in said mixture.

17. The process of claim 16 wherein the proportion of $P_2O_5$ added as phosphoric acid to said mixture ranges from about 26 to about 31 percent by weight of the total $P_2O_5$ in said mixture.

* * * * *